(12) United States Patent
Yagami

(10) Patent No.: US 7,096,751 B2
(45) Date of Patent: Aug. 29, 2006

(54) MEASURING APPARATUS AND ACCURACY ANALYZING APPARATUS HAVING THE SAME

(75) Inventor: Toru Yagami, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 122 days.

(21) Appl. No.: 10/739,000

(22) Filed: Dec. 19, 2003

(65) Prior Publication Data

US 2004/0129055 A1 Jul. 8, 2004

(30) Foreign Application Priority Data

Dec. 24, 2002 (JP) ............................. 2002-372789

(51) Int. Cl.
*G01B 5/20* (2006.01)
(52) U.S. Cl. .................................................. 73/865.8
(58) Field of Classification Search ............... 73/865.8, 73/865.9
See application file for complete search history.

(56) References Cited

U.S. PATENT DOCUMENTS

| | | | | |
|---|---|---|---|---|
| 4,819,339 A | * | 4/1989 | Kunzmann et al. | ........... 33/503 |
| 4,955,227 A | * | 9/1990 | Fujita et al. | ............. 73/104 |
| 6,092,411 A | * | 7/2000 | Tokoi | ............. 73/1.79 |
| 6,155,542 A | * | 12/2000 | Kato et al. | ............. 267/136 |
| 6,721,036 B1 | * | 4/2004 | Scheiberlich et al. | ......... 355/53 |

FOREIGN PATENT DOCUMENTS

JP 6-226595 8/1994

* cited by examiner

*Primary Examiner*—Robert Raevis
(74) *Attorney, Agent, or Firm*—Westerman, Hattori, Daniels & Adrian, LLP (57) ABSTRACT

A measuring apparatus 2 comprises: a base 10 fixed onto the rotary table 83; a rotational angular position detector 35 having first and second members 36 and 37 mounted in relatively rotatable fashion about a preset rotational center axis, one member being provided with a scale and the other with a reading device, wherein the first member 36 is mounted fixedly on the base 10; a restraining mechanism 55 which engages with the second member 37 of the rotational angular position detector 35 and thereby restrains rotation of the second member 37, while allowing the base 10 and the rotational angular position detector 35 to move in vertical direction; and a ring-shaped detection member 49 mounted perpendicularly on the base 10 by orienting center axis at right angles to the upper surface of the rotary table 83 and accommodating therein the rotational angular position detector 35.

6 Claims, 4 Drawing Sheets

MEASURING APPARATUS AND ACCURACY ANALYZING APPARATUS HAVING THE SAME

BACKGROUND OF THE INVENTION

1. Field of the Invention

The present invention relates to a measuring apparatus for measuring the rotational angular position of a rotary table and a displacement in a direction along its rotational center axis, and an accuracy analyzing apparatus, equipped with the measuring apparatus, for analyzing rotational accuracy of the rotary table, accuracy of its rotation operation, and dynamic accuracy in the direction along its rotational center axis.

2. Description of the Prior Art

In the field of machine tools, for example, a rotary table is used that is suitably equipped with a horizontal loading surface, and that can be indexed at a prescribed rotational angle (rotational angular position) by rotating about its rotational center axis extending at right angles to the loading surface; since the indexing accuracy of such a rotary table and the dynamic accuracy in the direction along its rotational center axis directly affect the machining accuracy, these accuracies are suitably measured as needed at the time of use as well as at the time of manufacture.

Here, the dynamic accuracy in the direction along the rotational center axis of the rotary table concerns the displacement of the loading surface that occurs in the direction along the rotational center axis (i.e., in the vertical direction) when the rotary table is rotated about its rotational center axis. This displacement occurs, for example, when the rotational center axis runs out during rotation of the rotary table, or when the loading surface of the rotary table is not properly oriented at right angles to the rotational center axis, but is tilted from the horizontal.

In the prior art, no apparatus has been known that can comprehensively measure the indexing accuracy of such a rotary table and the accuracy in the direction along its rotational center axis, and therefore, these accuracies have been measured individually by using different apparatuses, as briefly described below.

First, the accuracy in the direction along the rotational center axis of the rotary table has been measured using, for example, a level or like instrument, as a tilt of the upper surface of the rotary table against the horizontal plane. However, the measurement using such a level is of static nature and is limited to the case where the loading surface of the rotary table is tilted with respect to the horizontal plane; therefore, when the rotational center axis is running out, the run-out cannot be detected.

On the other hand, the indexing accuracy is measured using an autocollimator, but in this case, there is a limit to the number of reflecting mirrors that can be used, and generally it is only possible to measure the indexing accuracy every 30 degrees. In view of this, measurements have been attempted using rotary encoders that can make measurements at any given rotational angle.

There are various types of rotary encoders, such as optical type, magnetic type, contact type, and capacitance type, but the basic structure is common, that is, the rotary encoder includes two members, the first and second members, mounted in relatively rotatable fashion about a preset rotational center axis, one member being provided with a scale and the other with a reading device; here, the first member is, for example, fixed to the loading surface of the rotary table and the second member is held in a non-rotating condition, and in this condition, the scale position is detected by the reading device to detect the relative rotational angular position between the two members, thus measuring the indexing accuracy of the rotary table.

Here, the relative positional relationship between the scale and the reading device is extremely important in detecting the relative rotational angular position between the two members, and if the positional relationship between the two is displaced from the initially set state, the rotational angular position cannot be measured accurately. Accordingly, when measuring the indexing accuracy of the rotary table by using such a rotary encoder, the rotational center axis of the two members constituting the rotary encoder must be accurately aligned with the rotational center axis of the rotary table.

However, in the prior art, there has not been available any apparatus that can align the rotational center axis of the rotary encoder with the rotational center axis of the rotary table in a simple manner, and there has been no choice but to employ, for example, a technique in which, with a contact type indicator held in contact with the outer periphery of the rotary encoder on the rotary table, the rotary table is rotated and, while measuring the relative displacement between the rotational center axis of the rotary encoder and the rotational center axis of the rotary table, the position of the rotary encoder on the rotary table is adjusted manually so that the measured displacement becomes zero.

However, manually aligning the rotational center axis of the rotary encoder with the rotational center axis of the rotary table is extremely inefficient as the manual adjustment is not only time consuming but requires skill.

The present invention has been devised in view of the above situation, and it is an object of the invention to provide a measuring apparatus that can easily and accurately measure the rotational angular position of the rotary table and the displacement in the direction along its rotational center axis, and an accuracy analyzing apparatus that can easily and accurately analyze the rotational accuracy of the rotary table, the accuracy of its rotation operation, and the dynamic accuracy in the direction along its rotational center axis.

SUMMARY OF THE INVENTION

The invention that attains the above objects concerns a measuring apparatus comprising: a base fixed onto a rotary table; a detection member mounted perpendicularly on the base; and a vertical position detector for detecting a vertical position of an upper surface of the detection member.

According to this invention, when the rotary table is rotated about its rotational center axis, the base and the detection member both fixed to the rotary table rotate with the rotary table, and the vertical position of the upper surface of the detection member is constantly detected by the vertical position detector.

Generally, the rotary table has a horizontal loading surface (upper surface) and is constructed to rotate about the rotational center axis extending at right angles to the loading surface. Accordingly, when the rotary table is rotated, if its rotational center axis runs out, or if the loading surface of the rotary table is not properly oriented at right angles to the rotational center axis, but is tilted from the horizontal, the vertical position of the loading surface at a prescribed rotational angular position of the rotary table constantly displaces as the rotary table rotates, and the vertical position, at the prescribed angular position, of the upper surface of the detection member mounted perpendicularly on the base of the rotary table also displaces constantly.

In the measuring apparatus according to the present invention, since the vertical position of the upper surface of the detection member is constantly detected by the vertical position detector, the displacement of the upper surface of the detection member can be detected that occurs when the rotational center axis runs out or when the loading surface of the rotary table is not properly oriented at right angles to the rotational center axis; by detecting such displacement, the accuracy relating to the run-out of the rotational center axis and the accuracy of the perpendicularity between the rotary table and the rotational center axis can be evaluated.

In addition to the above configuration, the measuring apparatus according to the present invention further comprises: a rotational angular position detector having first and second members mounted in relatively rotatable fashion about a preset rotational center axis, one of the members being provided with a scale and the other member with a reading device, wherein the first member is mounted fixedly on the base; and a restraining means engaging with the second member of the rotational angular position detector and thereby restraining rotation of the second member, while allowing the base and the rotational angular position detector to move in a vertical direction, and wherein:

the detection member is formed from a ring-shaped member which is mounted perpendicularly on the base by orienting the center axis of the ring-shaped member at right angles to the upper surface of the rotary table, and the first member of the rotational angular position detector is mounted fixedly on the base with the rotational angular position detector accommodated within the detection member.

In this measuring apparatus, after the base with the first member of the rotational angular position detector fixedly mounted thereon has been fixed onto the rotary table by aligning the rotational center axis of the rotational angular position detector with the rotational center axis of the rotary table, the rotary table is indexed to the prescribed rotational angular position. Since the rotation of the second member of the rotational angular position detector is restrained by the restraining means, the first member rotates relative to the second member as the rotary table rotates. As the first member is rotated relative to the second member, the rotational angular position of the rotary table is detected, and the rotational accuracy of the rotary table is evaluated based on the detected position.

As described above, when the rotational center axis runs out, or when the loading surface of the rotary table is not properly oriented at right angles to the rotational center axis, the rotary table undergoes vertical displacements, and as a result, the base and the rotational angular position detector mounted on the rotary table also undergo vertical displacements; however, since the restraining means is provided so as to allow the base and the rotational angular position detector to move in the vertical direction, the rotation of the first member will not hampered by the action of the restraining means.

In this way, according to the above measuring apparatus, not only the accuracy relating to the run-out of the rotational center axis and the accuracy of the perpendicularity between the rotary table and the rotational center axis, but also the rotational accuracy of the rotary table can be evaluated.

Here, the rotational angular position of the rotary table cannot be accurately detected unless the rotational center axis of the rotational angular position detector is accurately aligned with the rotational center axis of the rotary table.

Therefore, the measuring apparatus should be configured as described below. That is, in addition to the above configuration, the measuring apparatus further comprises: a rotating stage mounted on the base in such a manner as to be rotatable relative to the base via the second member and the first member of the rotational angular position detector, with the second member mounted fixedly to the rotating stage; a movable member mounted in such a manner as to be freely movable relative to the rotating stage along a first axis oriented at right angles to the rotational center axis of the rotary table and along a second axis oriented at right angles to both the rotational center axis and the first axis; a guiding mechanism, mounted on the rotating stage, for guiding the movable member for movement in directions along the first and second axes; and an axial direction position detector for detecting a relative positional relationship between the rotating stage and the movable member in the first axis and second axis directions, and wherein: the restraining means is constructed so as to engage with the movable member and restrain the movement of the movable member at least in a plane crossing at right angles to the rotational center axis of the rotary table, while allowing a structure comprising the base, the rotational angular position detector, the rotating stage, and the movable member to move in a vertical direction.

According to this measuring apparatus, after the base has been mounted and fixed onto the rotary table, the movement of the movable member is restrained by the restraining means; in this condition, when the rotary table is rotated about its rotational center axis, the base and the first member of the rotational angular position detector fixed to it rotate with the rotary table about its rotational center axis, while the second member of the rotational angular position detector, the rotating stage, and the movable member are held in a non-rotating condition by the restraining action of the restraining means.

If there is a misalignment between the rotational center axis of the rotary table and the rotational center axis of the rotational angular position detector, the base with the first member of the rotational angular position detector fixed thereto and the rotating stage with the second member of the rotational angular position detector fixed thereto move in swiveling fashion about the rotational center axis of the rotary table, causing a relative rotational motion between the first member and the second member.

When this swiveling motion occurs, relative displacements along the first and second axes are caused between the rotating stage and the movable member mounted in such a manner as to be freely movable relative to each other in each of the first axis and second axis directions, that is, the rotating stage is moved along the first axis and second axis directions by being guided on the guiding mechanism; with such movements of the rotating stage along the first and second axes, the misalignment between the rotational center axis of the rotary table and the rotational center axis of the rotational angular position detector is absorbed and, with the movement of the movable member restrained, the base and the rotating stage move in swiveling fashion about the rotational center axis of the rotary table. When the rotating stage moves along the first and second axes, the positions on the respective axes are detected by the axial direction position detector.

The movement of the rotating stage along the first and second axes is proportional to the amount of misalignment between the rotational center axis of the rotary table and the rotational center axis of the rotational angular position detector, and the amount of misalignment between the rotational center axis of the rotary table and the rotational center axis of the rotational angular position detector in the directions along the first and second axes can be computed from the amount of movement of the rotating stage. That is, the amount of misalignment (positional difference) in each direction is computed by taking the difference between the maximum and minimum values of the position of the rotating stage in each of the first axis and second axis directions when the rotary table makes one rotation, and by dividing the difference by 2.

In this way, according to the above measuring apparatus, the amount of misalignment between the rotational center axis of the rotary table and the rotational center axis of the rotational angular position detector can be easily detected by simply rotating the rotary table after the measuring apparatus has been suitably mounted on the rotary table. Then, by appropriately adjusting the position of the measuring apparatus based on the thus detected amount of misalignment, the rotational center axis of the rotational angular position detector can be accurately aligned with the rotational center axis of the rotary table.

Further, the measuring apparatus according to the present invention comprises, in addition to the above configuration, a mounting means for mounting the base on the rotary table in such a manner as to be movable along the first and second axes; and a position adjusting means for adjusting the position of the base in the first axis and second axis directions.

With this configuration, based on the amount of misalignment computed as described above between the rotational center axis of the rotary table and the rotational center axis of the rotational angular position detector, the base is moved along the first and second axes by the position adjusting means in such a manner as to cancel the computed amount of misalignment; in this way, the rotational center axis of the rotational angular position detector can be accurately aligned with the rotational center axis of the rotary table.

The position adjusting means may include: a driving mechanism for moving the base in each of the directions along the first and second axes; and a controller for moving the base in each of the first axis and second axis directions by controlling the operation of the driving mechanism based on the position detected in each of the directions by the axial direction position detector. According to this position adjusting means, by using the driving mechanism whose driving operation is controlled by the controller, the base can be moved automatically along the first and second axes in such a manner as to cancel the computed amount of misalignment; in this way, the rotational center axis of the rotational angular position detector can be aligned automatically and accurately with the rotational center axis of the rotary table.

The above measuring apparatus may be incorporated into an accuracy analyzing apparatus such as described below. That is, the accuracy analyzing apparatus is an apparatus for analyzing the dynamic accuracy of the rotary table in a machine tool equipped with the rotary table and a rotational driving mechanism for rotating the rotary table, and comprises: the measuring apparatus; and an analyzing means for analyzing the dynamic accuracy in a direction along the rotational center axis of the rotary table based on a value detected by the vertical position detector.

According to this accuracy analyzing apparatus, the dynamic accuracy in the direction along the rotational center axis of the rotary table is analyzed by the analyzing means, based on the value detected by the vertical position detector. Here, the dynamic accuracy concerns the displacement of the upper surface of the rotary table that occurs in the direction along the rotational center axis (i.e., in the vertical direction) when the rotary table is rotated about its rotational center axis.

The accuracy analyzing apparatus is also an apparatus for analyzing the rotational accuracy and the dynamic accuracy of the rotary table in a machine tool equipped with the rotary table, a rotational driving mechanism for rotating and indexing the rotary table to a prescribed rotational angular position, and a control apparatus for controlling the operation of the rotational driving mechanism, and comprises: the measuring apparatus; and an analyzing means for analyzing the rotational accuracy of the rotary table and the dynamic accuracy in a direction along the rotational center axis thereof based on a rotational angular position commanded by the control apparatus, the actual rotational angular position of the rotary table detected by the rotational angular position detector, and the value detected by the vertical position detector.

According to this accuracy analyzing apparatus, in addition to the above described dynamic accuracy, the rotational accuracy (indexing accuracy) is analyzed by the analyzing means, based on the commanded rotational angular position from the control apparatus and the actual rotational angular position of the rotary table detected by the rotational angular position detector mounted on the rotary table; that is, the accuracy of response to the commanded value is analyzed.

Further, the accuracy analyzing apparatus is an apparatus for analyzing the accuracy of rotation operation of the rotary table and the dynamic accuracy thereof in a machine tool equipped with the rotary table, the rotational driving mechanism for rotating and indexing the rotary table to a prescribed rotational angular position, a rotational angular position detector for detecting a rotational angular position driven and controlled by the rotational driving mechanism, and a control apparatus for performing feedback control of the rotational driving mechanism based on the rotational angular position detected by the rotational angular position detector, and comprises: the measuring apparatus; and an analyzing means for analyzing the accuracy of rotation operation of the rotary table and the dynamic accuracy in a direction along the rotational center axis thereof based on the rotational angular position detected by the rotational angular position detector of the machine tool, the rotational angular position detected by the rotational angular position detector of the measuring apparatus, and the value detected by the vertical position detector.

According to this accuracy analyzing apparatus, in addition to the above described dynamic accuracy, the accuracy of rotation operation of the rotary table is analyzed by the analyzing means, based on the rotational angular position detected by the rotational angular position detector of the machine tool and the rotational angular position detected by the rotational angular position detector of the measuring apparatus.

The members constituting the rotational driving mechanism are not perfectly rigid; rather, the rotational driving mechanism is usually constructed using members that suffer elastic deformation when subjected to external force. Accordingly, when the rotary table is driven, the internal driving system may suffer elastic deformation, causing a difference between the value input to the system and the value output from the system. Furthermore, backlash exists between the meshing gears in the rotational driving mechanism. Moreover, the rotational angle changes due to thermal deformation of the rotational driving mechanism. These are known as lost motion.

According to the above accuracy analyzing apparatus, the rotational angular position (input value to the system) detected by the rotational angular position detector of the machine tool after driving and controlling and the actual rotational angular position (output value from the system) of the rotary table detected by the rotational angular position detector of the measuring apparatus are compared and analyzed; in this way, the accuracy of rotation operation of the rotary table, that is, operation errors such as the lost most described above, can be analyzed. By applying appropriate corrections based on the amount of operation error thus analyzed, the rotational accuracy (indexing accuracy) of the rotary table can be enhanced.

DESCRIPTION OF THE PREFERRED EMBODIMENT

Figure 1:
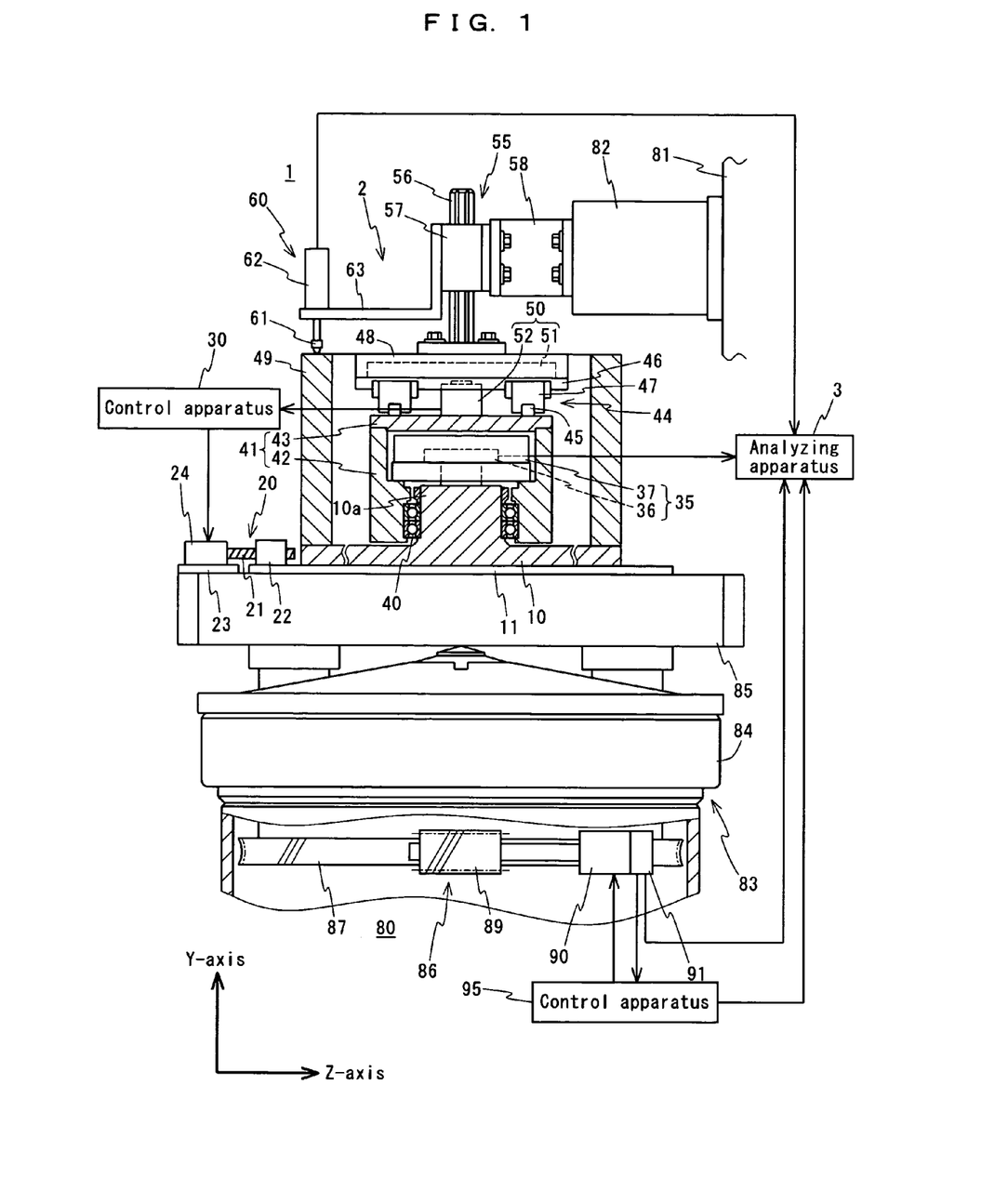
FIG. 1 is a front view showing, partly in block diagram and partly in cross section, the simplified configuration of an accuracy analyzing apparatus according to one embodiment of the present invention.

The preferred embodiment of the present invention will be described below with reference to the accompanying drawings. FIG. 1 is a front view showing, partly in block diagram and partly in cross section, the simplified configuration of an accuracy analyzing apparatus according to one embodiment of the present invention, and FIG. 2 is a plan view showing, partly in block diagram, the simplified configuration of the accuracy analyzing apparatus according to this embodiment.

Figure 2:
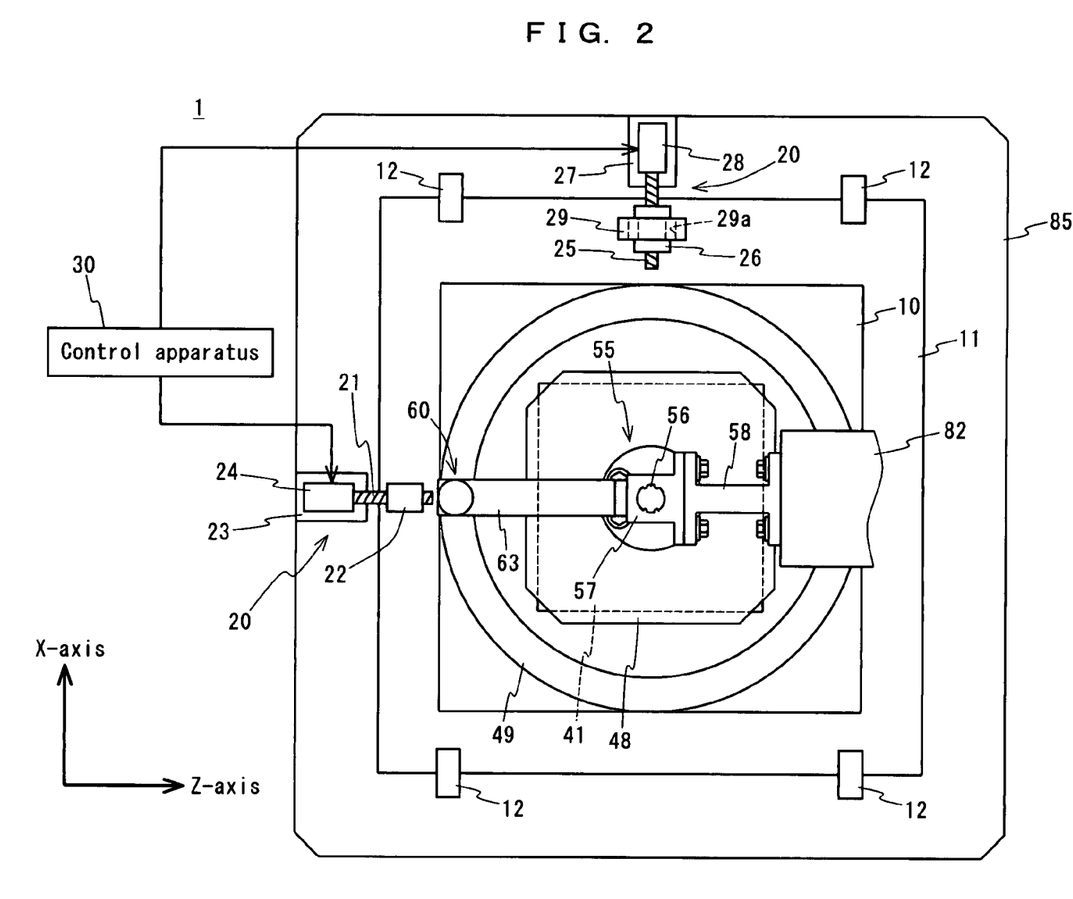
FIG. 2 is a plan view showing, partly in block diagram, the simplified configuration of the accuracy analyzing apparatus according to the embodiment.

As shown in FIGS. 1 and 2, the accuracy analyzing apparatus 1 of this embodiment comprises a measuring apparatus 2 which is mounted on a rotary table 83 of a machine tool 80, and an analyzing apparatus 3 which, based on values, etc. detected by the measuring apparatus 2, analyzes the rotational accuracy (indexing accuracy) of the rotary table 83, the accuracy of its rotation operation, and the dynamic accuracy in the direction along its rotational center axis.

The machine tool 80 of this embodiment comprises: a bed (not shown); a column (not shown) mounted on the bed (not shown); a spindle head 81 supported on the column (not shown) and movable in Y-axis direction; a spindle 82 supported by a spindle head 81 in such a manner as to be freely rotatable about its axis; the rotary table 83 mounted on the bed (not shown) and movable in X-axis and Z-axis directions; a rotational driving mechanism 86 for rotating the rotary table 83 about the rotational center axis thereof and thereby indexing it to a prescribed rotational angular position; a rotary encoder (rotational angular position detector) 91 for detecting the rotational angular position driven and controlled by the rotational driving mechanism 86; and a control apparatus 95 for performing feedback control of the rotational driving mechanism 86 based on the rotational angular position fed back from the rotary encoder 91.

The rotary table 83 comprises a rotating base 84 mounted rotatably about the rotational center axis and a pallet 85 which is mounted fixedly on the rotating base 84 and rotates together with the rotating base 84; here, the rotating base 84 is driven by the rotational driving mechanism 86. The pallet 85 is placed with its upper surface held in a horizontal position, and the rotational center axis is set at right angle to that surface.

The rotational driving mechanism 86 comprises a worm wheel 87 mounted on a rotating shaft (not shown) of the rotating base 84, a worm 89 meshing with the worm wheel 87, and a servo motor 90 for rotating the worm 89 about its axis; the rotary encoder 91 is attached to this servo motor 90 and, by detecting the rotational angular position of the servo motor 90, the rotational angular position of the rotary table 83 driven and controlled by the rotational driving mechanism 86 is indirectly measured.

The rotational angular position detected by the rotary encoder 91 is sent to the analyzing apparatus 3 as well as to the control apparatus 95.

The measuring apparatus 2 comprises: a base 10 which is mounted on the pallet 85 of the machine tool 80 via a mounting plate 11 fixed to the underside of the base 10; a position adjusting mechanism 20 for adjusting the position of the mounting plate 11 on the pallet 85; a rotary encoder (rotational angular position detector) 35 disposed on the upper surface of the base 10; a rotating stage 41 mounted on the base 10 via the rotary encoder 35; a cross guide (guiding mechanism) 44, mounted on the rotating stage 41, for guiding movements in directions along X-axis (first axis) extending at right angles to the rotational center axis of the rotary table 83 and along Z-axis (second axis) extending at right angles to both the X-axis and the rotational center axis; a movable member 48 supported in such a manner as to be freely movable in directions along the X- and Z-axes by the cross guide 44; an axial direction position detector 50 for detecting the relative positional relationship between the rotating stage 41 and the movable member 48 in the X-axis and Z-axis directions; a restraining mechanism 55 for restraining the movement of the movable member 48 in a plane defined by the X- and Z-axes, while allowing a structure comprising the mounting plate 11, base 10, rotary encoder 35, rotating stage 41, movable member 48, and detection member 49 to move in a vertical direction; the detection member 49 of a ring shape mounted perpendicularly on the base 10; and a vertical position detector 60 for detecting the vertical position of the upper surface of the detection member 49.

The mounting plate 11 is clamped to the pallet 85 by a clamping device 12 mounted on the pallet 85 and, when unclamped, is movable in the X-axis and Z-axis directions; the mounting plate 11 rotates with the pallet 85 about the rotational center axis of the rotary table 83.

The rotary encoder 35 comprises a first member 36 and a second member 37 mounted in relatively rotatable fashion about a prescribed rotational center axis, the second member 37 being provided with a scale and the first member 36 with a reading device.

The base 10 has an upwardly protruding center portion, and the first member 36 is fixed to the upper surface of this protruding portion 10a. The rotating stage 41 comprises a cylindrically shaped supporting member 42 having a hollow space inside, and a holding plate 43 placed on the upper edge face of the supporting member 42; the second member 37 is fixed to the bottom surface inside the supporting member 42. The rotating stage 41 is supported on the base 10 in such a manner as to be rotatable relative to the base 10 via a bearing 40 provided between the lower inner circumferential surface of the supporting member 42 and the outer circumferential surface of the protruding member 10a.

The scale provided on the second member 37 is read by the reading device provided on the first member 36, to detect the rotational angular position of the first member 36 relative to the second member 37, or in other words, the rotational angular position of the base 10 to which the first member 36 is fixed (and hence, the rotary table 83 to which the base 10 is secured via the mounting plate 11). The rotational angular position detected by the reading device of the first member 36 is sent to the analyzing apparatus 3.

The cross guide 44 comprises: an X-axis guide rail 45 mounted fixedly to the upper surface of the holding plate 43 of the rotating stage 41; a Z-axis guide rail 46 mounted fixedly to the underside of the movable member 48; and sliders 47 engaging on the X-axis guide rail 45 and the Z-axis guide rail 46 and freely movable in the respective directions along these rails.

The axial direction position detector 50 comprises a grid scale 51, mounted on the underside of the movable member 48, whose graduations are formed in a grid pattern along the X- and Z-axes, and a detection head 52, mounted on the upper surface of the holding plate 43, for reading the graduations on the grid scale 51; the position of the movable member 48 detected in each of the X-axis and Z-axis directions by the detection head 52 is sent to a control apparatus 30 (to be described later) for the position adjusting mechanism 20.

The restraining mechanism 55 comprises a ball spline shaft 56, mounted perpendicularly on the upper surface of the movable member 48, whose axis is parallel to the rotational center axis of the rotary table 83, a ball nut 57 engaging with the ball spline shaft 56, and a fixing member 58 for fixing the ball nut 57 to the spindle 82; the ball nut 57, because of its engagement with the ball spline shaft 56, is made relatively movable only along the axial direction thereof.

According to this restraining mechanism 55, while the movement of the movable member 48 in the plane defined by the X- and Z-axes is restrained, the structure comprising the mounting plate 11, base 10, rotary encoder 35, rotating stage 41, movable member 48, and detection member 49 is allowed to move in the axial direction of the ball spline shaft 56.

The detection member 49 is mounted perpendicularly on the base 10, with its center axis oriented at right angles (i.e., vertically) to the upper surface of the pallet 85, and with the rotary encoder 35, the rotating stage 41, the movable member 48, etc. accommodated inside.

The vertical position detector 60 comprises a probe 61, which contacts the upper surface of the detection member 49, and a detector proper 62, which converts the positional change (the amount of displacement) of the probe 61 into a voltage signal or the like and sends it to analyzing apparatus 3, and is mounted to an L-shaped mounting member 63 attached to the ball nut 57 of the restraining mechanism 55.

The position adjusting mechanism 20 comprises: a Z-axis ball screw 21 and an X-axis ball screw 25 installed along the Z-axis and the X-axis, respectively; a Z-axis nut 22 fixed to the mounting plate 11 and screwed onto the Z-axis ball screw 21; an X-axis nut 26 screwed onto the X-axis ball screw 25; an engaging member 29 having a through hole 29a with the X-axis nut 26 inserted- therein, and fixed to the mounting plate 11, the engaging member 29 thus engaging and supporting the X-axis nut 26 so that the X-axis nut 26 can move in the Z-axis direction but cannot move in the X-axis direction; a Z-axis driving motor 24 and an X-axis driving motor 28, fixed to the pallet 85 via respective supporting members 23 and 27, for rotating the Z-axis ball screw 21 and the X-axis ball screw 25 about their respective axes; and the control apparatus 30 for controlling the operation of the Z-axis driving motor 24 and the X-axis driving motor 28 based on the positions in the Z-axis and X-axis directions received from the axial direction position detector 50, and thereby moving the mounting plate 11 in the Z-axis and X-axis directions.

The control apparatus 30 is also configured to control the operation of the clamping device 12; that is, the clamping device 12 is operated to unclamp the mounting plate 11 before driving the Z-axis driving motor 24 and the X-axis driving motor 28, and to clamp the mounting plate 11 after the driving of the Z-axis driving motor 24 and the X-axis driving motor 28 is completed.

The analyzing apparatus 3 performs processing to analyze the rotational accuracy of the rotary table 83 driven by the control apparatus 95, the accuracy of its rotation operation, and the dynamic accuracy in the direction along its rotational center axis, based on the rotational angular position received from the rotary encoder 35, the rotational angular position received from the rotary encoder 91, and the detected value (voltage signal) received from the vertical position detector 60.

More specifically, for the rotational accuracy, the rotational angular position of the rotary table 83 that provides the operation target is received from the control apparatus 95 that performs feedback control of the rotational driving mechanism 86, and the actual rotational angular position of the rotary table 83 driven by the rotational driving mechanism 86 is received from the rotary encoder 35; then, by computing the difference between the two, the rotational accuracy of the rotary table 83 is computed.

For the accuracy of rotation operation, the rotational angular position of the rotary table 83 driven and controlled by the rotational driving mechanism 86 is received from the rotary encoder 91, and the actual rotational angular position of the rotary table 83 driven by the rotational driving mechanism 86 is received from the rotary encoder 35; then, by computing the difference between the two, the accuracy of the rotation operation of the rotary table 83 is computed.

For the dynamic accuracy, the value detected by the vertical position detector 60 is received and, based on the detected value, the dynamic accuracy is computed which relates to the displacement in the direction along the rotational center axis of the rotary table 83.

According to the thus configured accuracy analyzing apparatus 1 of the present embodiment, the rotational accuracy of the rotary table 83, the accuracy of its rotation operation, and the dynamic accuracy in the direction along its rotational center axis are analyzed as described below.

First, of the components constituting the measuring apparatus 2, the structure comprising the mounting plate 11, base 10, rotary encoder 35, rotating stage 41, cross guide 44, movable member 48, axial direction position detector 50, restraining mechanism 55, detection member 49, and vertical position detector 60 is mounted on the pallet 85, after which the position adjusting mechanism 20 and the clamping device 12 are suitably installed on the pallet 85, and the mounting plate 11 is clamped onto the pallet 85 by means of the clamping device 12. Here, the above structure is mounted on the pallet 85 while visually checking so that the rotational center axis of the rotary encoder 35 is roughly aligned with the rotational center axis of the pallet 85.

Next, after fixing the fixing member 58 of the restraining mechanism 55 to the spindle 82, the rotary table 83 and the spindle head 81 are respectively driven to suitably adjust their positions. Thus, the movement of the movable member 48 in the plane defined by the X- and Z-axes is restrained.

Then, the rotational driving mechanism 86 is driven by the control apparatus 95 to rotate the rotary table 83 at least 360 degrees about its rotational center axis; at this time, if there is a misalignment between the rotational center axis of the rotary table 83 and the rotational center axis of the rotary encoder 35 (which is most often the case), the base 10 with the first member 36 of the rotary encoder 35 fixed thereto and the rotating stage 41 with the second member 37 of the rotary encoder 35 fixed thereto move in swiveling fashion about the rotational center axis of the rotary table 83, causing a relative rotational motion between the first member 36 and the second member 37. At this time, the detection member 49 also moves in swiveling fashion about the rotational center axis of the rotary table 83.

When this swiveling motion occurs, relative displacements along the X- and Z-axes are caused between the rotating stage 41 and the movable member 48 mounted in such a manner as to be freely movable relative to each other in each of the X-axis and Z-axis directions, that is, the rotating stage 41 is moved along the X-axis and Z-axis directions by being guided on the cross guide 44; with such movements of the rotating stage 41 along the X- and Z-axes, the misalignment between the rotational center axis of the rotary table 83 and the rotational center axis of the rotary encoder 35 is absorbed and, with the movement of the movable member 48 restrained, the base 10 and the rotating stage 41 move in swiveling fashion about the rotational center axis of the rotary table 83.

Figure 3:
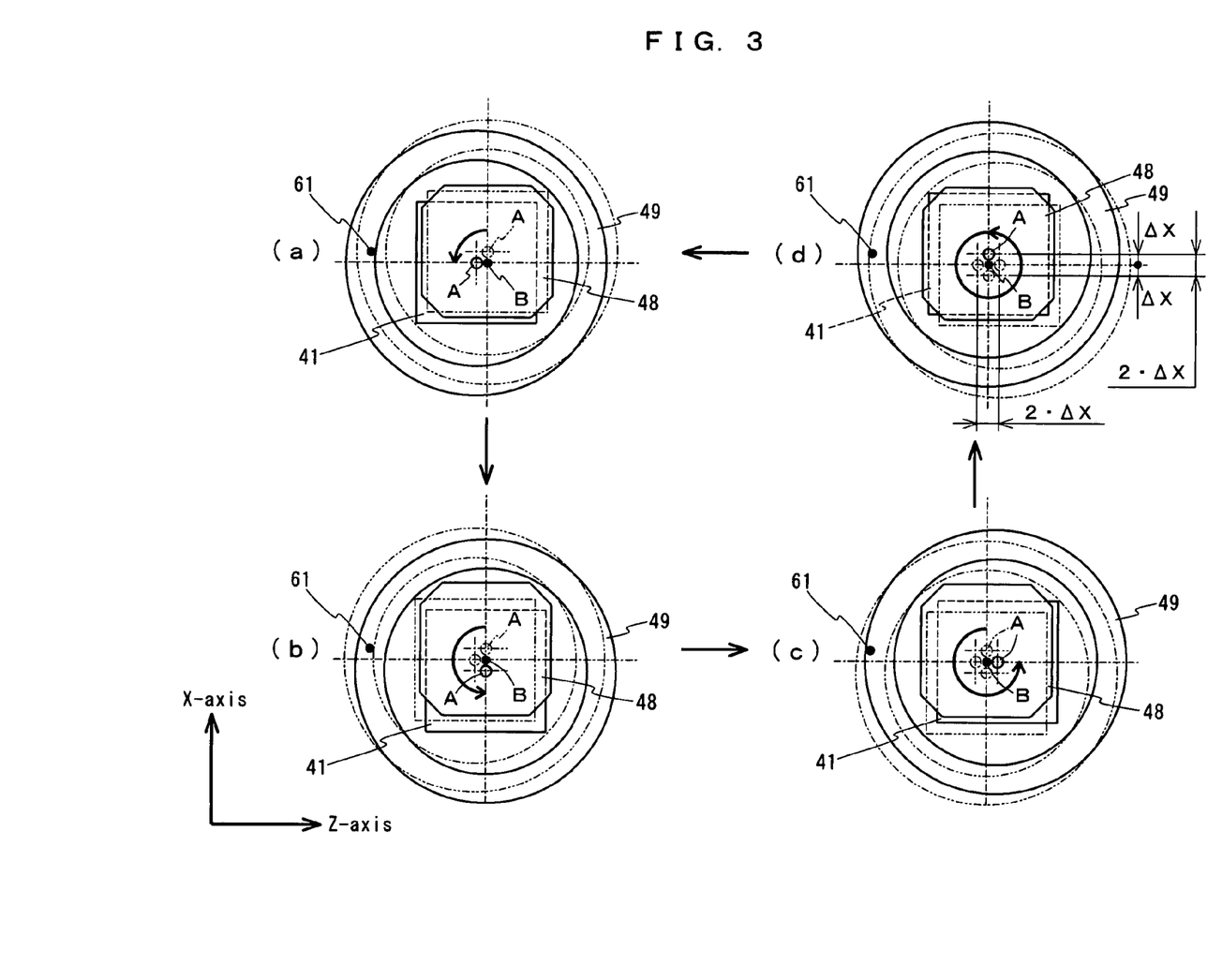
FIG. 3 is an explanatory diagram for explaining the condition of a measuring apparatus that changes with the rotation of a rotary table.

FIG. 3 shows how this is occurring. In the figure, reference character A indicates the rotational center axis of the rotary encoder 35, and B indicates the rotational center axis of the rotary table 83. The positional relationship among the rotating stage 41, the movable member 48, the detection member 49, and the probe 61 of the vertical position detector 60 is shown in part (a) when the rotary table 83 is caused to rotate 90 degrees counterclockwise, in part (b) when the rotary table 83 is caused to rotate 180 degrees counterclockwise, in part (c) when the rotary table 83 is caused to rotate 270 degrees counterclockwise, and in part (d) when the rotary table 83 is caused to rotate 360 degrees counterclockwise.

As shown in FIG. 3(d), when the amount of misalignment between the rotational center axis of the rotary encoder 35 and the rotational center axis of the rotary table 83 is denoted by $\Delta X$, the rotational center axis of the rotary encoder 35 is caused to move in swiveling fashion describing a circle of radius $\Delta X$ about the rotational center axis of the rotary table 83, and the amounts of movement of the rotating stage 41 in the X-axis and Z-axis directions, respectively, are each given as $2 \cdot \Delta X$.

The positions of the rotating stage 41 in the X-axis and Z-axis directions, respectively, are detected by the axial direction position detector 50, and the respective position data detected by the axial direction position detector 50 are sent to the control apparatus 30.

While the rotary table 83 is being driven for rotation, the control apparatus 30 receives the positions of the rotating stage 41 in the X-axis and Z-axis directions from the axial direction position detector 50, computes the amount of movement along each axis by taking the difference between the maximum and minimum values of the position of the rotating stage 41 in each of the X-axis and Z-axis directions when the rotary table 83 makes one rotation, and divides the amount of movement by 2 to compute the amount of misalignment between the rotational center axis of the rotary encoder 35 and the rotational center axis of the rotary table 83.

Next, after unclamping the mounting plate 11 by operating the clamping device 12, the control apparatus 30 feedback-controls the X-axis driving motor 28 and the Z-axis driving motor 24 based on the respective position data received from the axial direction position detector 50, and thereby causes the mounting plate 11 to move in the X-axis and Z-axis directions in such a manner as to cancel the amount of misalignment computed in the above manner. After being thus moved, the mounting plate 11 is once again clamped by the clamping device 12.

In this way, the rotational center axis of the rotary encoder 35 is accurately aligned with the rotational center axis of the rotary table 83.

Further, during the rotation of the rotary table 83, the vertical position of the upper surface of the detection member 49 is detected by the vertical position detector 60, and the detected position data is sent to the analyzing apparatus 3.

When the rotary table 83 is rotated, if its rotational center axis runs out, or if the loading surface of the pallet 85 is not properly oriented at right angles to the rotational center axis, but is tilted from the horizontal, the vertical position of the loading surface at a prescribed rotational angular position of the rotary table 83 constantly displaces as the rotary table 83 rotates, and the vertical position, at the prescribed angular position, of the upper surface of the detection member 49 mounted on the pallet 85 also displaces constantly.

Figure 4:
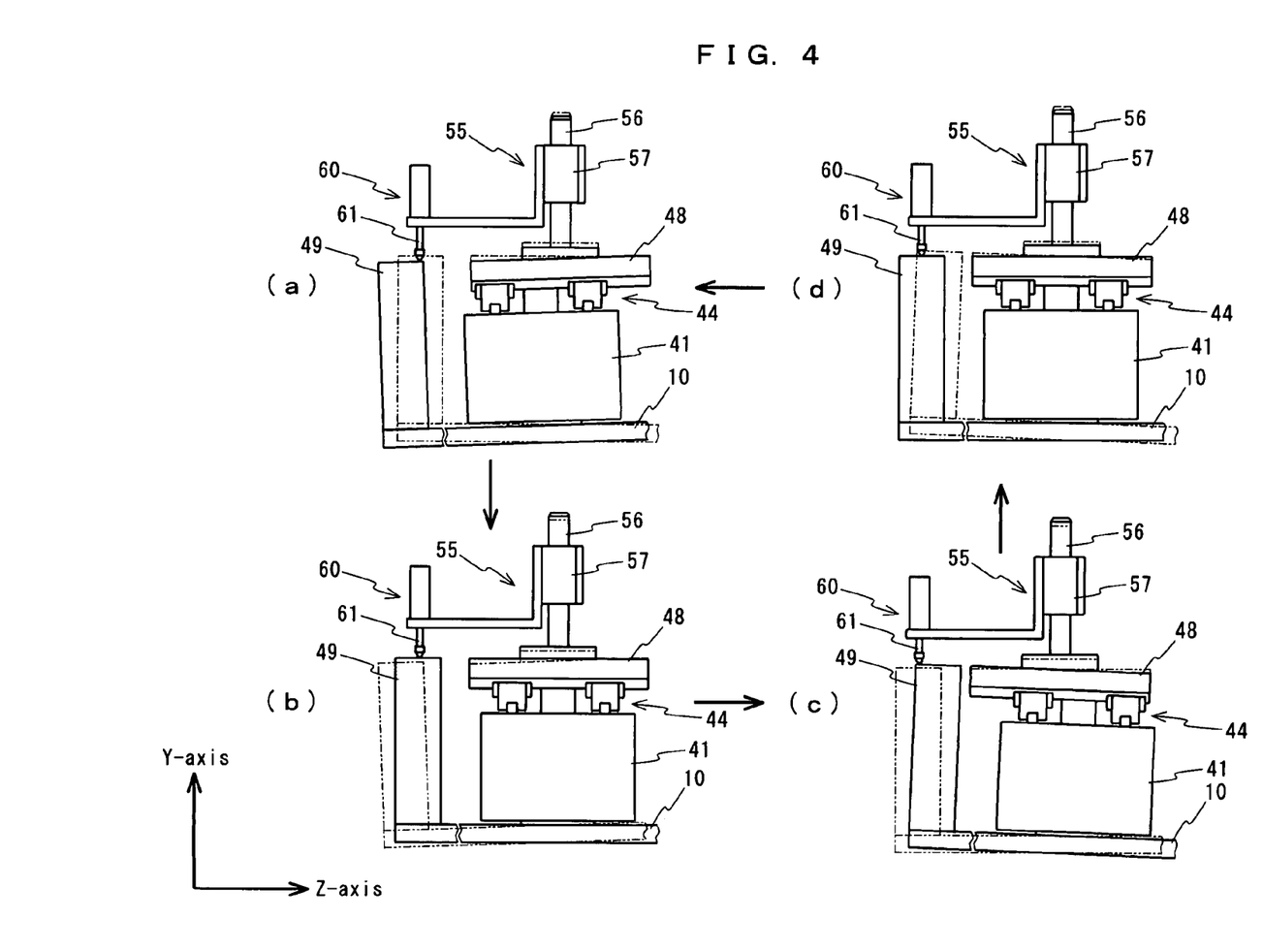
FIG. 4 is an explanatory diagram for explaining the condition of the measuring apparatus that changes with the rotation of the rotary table.

FIG. 4 shows how this is occurring. Parts (a), (b), (c), and (d) of the figure show the positional relationship among the base 10, rotating stage 41, movable member 48, detection member 49, restraining mechanism 55, and vertical position detector 60 when the rotational angular position of the rotary table 83 is at 90 degrees, 180 degrees, 270 degrees, and 360 degrees, respectively.

Accordingly, by detecting the vertical position of the upper surface of the detection member 49 with the vertical position detector 60, and observing how the position changes while the rotary table 83 is rotating, the accuracy relating to the run-out of the rotational center axis and the accuracy of the perpendicularity between the loading surface of the pallet 85 and the rotational center axis can be evaluated.

The analyzing apparatus 3 receives the values detected by the vertical position detector 60 and, based on the received detected values, computes the dynamic accuracy which relates to the displacement in the direction along the rotational center axis of the rotary table 83, by calculating the displacement as the difference between the maximum and the minimum of the detected values.

Next, under control of the control apparatus 95, the rotary table 83 is driven for rotation by the rotational driving mechanism 86 and indexed to an arbitrary rotational angular position. At this time, the rotational angular position (operation target angular position) to which the rotary table 83 is to be indexed by rotation is sent from the control apparatus 95 to the analyzing apparatus 3, while the rotational angular positions detected by the rotary encoders 35 and 91 are sent from the respective rotary encoders 35 and 91 to the analyzing apparatus 3, and the analyzing apparatus 3 analyzes the rotational accuracy of the rotary table 83 and the accuracy of its rotation operation.

The rotational angular position detected by the rotary encoder 35 is the actual rotational angular position of the rotary table 83. First, the analyzing apparatus 3 computes the rotational error, i.e., the rotational accuracy, of the rotary table 83 by computing the difference between the operation target angular position received from the control apparatus 95 and the actual rotational angular position of the rotary table 83 received from the rotary encoder 35.

Next, the analyzing apparatus 3 computes the accuracy of rotation operation of the rotary table 83 by computing the difference between the rotational angular position received from the rotary encoder 91, i.e., the rotational angular position of the rotary table 83 driven and controlled by the rotational driving mechanism 86, and the actual rotational angular position of the rotary table 83 received from the rotary encoder 35.

The worm wheel 87 and the worm 89, which constitute the rotational driving mechanism 86, and the rotating base 84 of the rotary table 83 are not perfectly rigid; rather, they usually suffer elastic deformation when subjected to external force. Accordingly, when they are driven, elastic deformation may occur, causing a difference between the rotational driving position feedback-controlled by the control apparatus 95 (the rotational driving position input to the rotational driving mechanism 86) and the actual rotational angular position of the rotary table 83 (more properly, the pallet 85) (the rotational driving position output from the rotational driving mechanism 86). Furthermore, backlash exists between the meshing gears in the rotational driving mechanism 86. Moreover, the rotational angle changes due to thermal deformation of the rotational driving mechanism 86. These are known as lost motion. The analyzing apparatus 3 computes the amount of lost motion (the accuracy of rotation operation) by computing the difference between the rotational angular position received from the rotary encoder 91 and the actual rotational angular position of the rotary table 83 received from the rotary encoder 35, as described above.

As described in detail above, according to the accuracy analyzing apparatus 1 of the present embodiment, by detecting the displacement occurring in the direction along the rotational center axis of the rotary table 83 in such cases as when the rotary table 83 is tilted, the dynamic accuracy in the direction along the rotational center axis of the rotary table 83 can be analyzed based on the detected displacement.

Further, after the measuring apparatus 2, which includes the rotary encoder 35 for analyzing the rotational accuracy of the rotary table 83 and the accuracy of its rotation operation, has been suitably mounted on the pallet 85 of the rotary table 83, the amount of misalignment between the rotational center axis of the rotary table 83 and the rotational center axis of the rotary encoder 35 can be easily detected by simply rotating the rotary table 83; then, based on the thus detected amount of misalignment, the rotational center axis of the rotary encoder 35 can be accurately aligned with the rotational center axis of the rotary table 83 by means of the position adjusting mechanism 20.

When the rotary encoder 35 is accurately aligned with respect to the rotary table 83 as described above, the rotational accuracy and the accuracy of rotation operation can be analyzed with high accuracy. Furthermore, by computing the amount of lost motion, correction that matches the lost motion can be applied, and the rotational accuracy (indexing accuracy) of the rotary table 83 can thus be enhanced.

In this way, according to the above accuracy analyzing apparatus 1, various kinds of accuracies, such as the rotational accuracy of the rotary table 83, the accuracy of its rotation operation, and the dynamic accuracy in the direction along its rotational center axis, can be analyzed using this single apparatus easily and with high accuracy.

While the invention has been described with reference to one specific embodiment, it will be appreciated that the invention is by no means limited to this specific embodiment.

For example, in the above embodiment, the vertical position detector 60 has been described as being a contact type position detector, but alternatively, a noncontact type position detector may be used.

What is claimed is:

1. A measuring apparatus comprising:
   a base fixed onto a rotary table;
   a detection member mounted perpendicularly on said base; and
   a vertical position detector for detecting a vertical position of an upper surface of said detection member;
   a rotational angular position detector having first and second members mounted in relatively rotatable fashion about a preset rotational center axis, one of said members being provided with a scale and the other member with a reading device, wherein said first member is mounted fixedly on said base; and
   a restraining means engaging with said second member of said rotational angular position detector and thereby restraining rotation of said second member, while allowing said base and said rotational angular position detector to move in a vertical direction, and wherein:
   said detection member is formed from a ring-shaped member which is mounted perpendicularly on said base by orienting a center axis of said ring-shaped member at right angles to an upper surface of said rotary table, and said first member of said rotational angular position detector is mounted fixedly on said base with said rotational angular position detector accommodated within said detection member.

2. A measuring apparatus as claimed in claim 1, further comprising:
   a rotating stage mounted on said base in such a manner as to be rotatable relative to said base via said second member and said first member of said rotational angular position detector, with said second member mounted fixedly to said rotating stage;
   a movable member mounted in such a manner as to be freely movable relative to said rotating stage along a first axis oriented at right angles to the rotational center axis of said rotary table and along a second axis oriented at right angles to both said rotational center axis and said first axis;
   a guiding mechanism, mounted on said rotating stage, for guiding said movable member for movement in directions along said first axis and said second axis; and
   an axial direction position detector for detecting a relative positional relationship between said rotating stage and said movable member in said first axis and second axis directions, and wherein:
   said restraining means is constructed so as to engage with said movable member and restrain the movement of said movable member at least in a plane crossing at right angles to the rotational center axis of said rotary table, while allowing a structure comprising said base, said rotational angular position detector, said rotating stage, and said movable member to move in a vertical direction.

3. A measuring apparatus as claimed in claim 2, further comprising:
   a mounting means for mounting said base on said rotary table in such a manner as to be movable along said first axis and said second axis; and
   a position adjusting means for adjusting the position of said base in said first axis and second axis directions.

4. A measuring apparatus as claimed in claim 3, wherein said position adjusting means comprises:
   a driving mechanism for moving said base in each of the directions along said first axis and said second axis; and
   a controller for moving said base in each of said first axis and second axis directions by controlling operation of said driving mechanism based on the position detected in each of said directions by said axial direction position detector.

5. An accuracy analyzing apparatus for analyzing rotational accuracy and dynamic accuracy of a rotary table in a machine tool equipped with said rotary table, a rotational driving mechanism for rotating and indexing said rotary table to a prescribed rotational angular position, and a control apparatus for controlling operation of said rotational driving mechanism, said accuracy analyzing apparatus comprising:
   said measuring apparatus as claimed in any one of claims 1 to 4; and
   an analyzing means for analyzing the rotational accuracy of said rotary table and the dynamic accuracy in a direction along the rotational center axis thereof based on a rotational angular position commanded by said control apparatus, the actual rotational angular position of said rotary table detected by said rotational angular position detector, and a value detected by said vertical position detector.

6. An accuracy analyzing apparatus for analyzing accuracy of rotation operation of a rotary table and dynamic accuracy thereof in a machine tool equipped with said rotary table, a rotational driving mechanism for rotating and indexing said rotary table to a prescribed rotational angular position, a rotational angular position detector for detecting a rotational angular position driven and controlled by said rotational driving mechanism, and a control apparatus for performing feedback control of said rotational driving mechanism based on the rotational angular position detected by said rotational angular position detector, said accuracy analyzing apparatus comprising:
   said measuring apparatus as claimed in any one of claims 1 to 4; and
   an analyzing means for analyzing the accuracy of rotation operation of said rotary table and the dynamic accuracy in a direction along the rotational center axis thereof based on the rotational angular position detected by said rotational angular position detector of said machine tool, the rotational angular position detected by said rotational angular position detector of said measuring apparatus, and a value detected by said vertical position detector.

* * * * *